US006647544B1

(12) United States Patent
Ryman et al.

(10) Patent No.: US 6,647,544 B1
(45) Date of Patent: Nov. 11, 2003

(54) METHOD AND SYSTEM FOR DEBUGGING HYBRID SOURCE CODE

(75) Inventors: Arthur B. Ryman, Thornhill (CA); Sheldon B. Wosnick, Toronto (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/437,620

(22) Filed: Nov. 10, 1999

(30) Foreign Application Priority Data

Nov. 30, 1998 (CA) .............................. 2255050

(51) Int. Cl.$^7$ .............................. G06F 9/44; H02H 3/05
(52) U.S. Cl. ..................... 717/124; 717/127; 714/38
(58) Field of Search .................. 717/124, 125–131, 717/136, 137, 139–141, 143, 146–148, 166; 714/37–39, 34, 35; 345/760; 709/201, 203; 712/227

(56) References Cited

U.S. PATENT DOCUMENTS

| 5,410,648 A | * | 4/1995 | Pazel ........................ 717/125 |
| 5,815,653 A | * | 9/1998 | You et al. ..................... 714/25 |
| 5,845,125 A | * | 12/1998 | Nishimura et al. ......... 717/129 |
| 5,848,274 A | * | 12/1998 | Hamby et al. .............. 717/153 |
| 5,973,696 A | * | 10/1999 | Agranat et al. ............. 345/760 |
| 6,063,133 A | * | 5/2000 | Li et al. ...................... 717/136 |
| 6,091,896 A | * | 7/2000 | Curreri et al. .............. 717/125 |
| 6,161,217 A | * | 12/2000 | Detlefs et al. .............. 717/141 |
| 6,249,907 B1 | * | 6/2001 | Carter et al. ................ 717/129 |
| 6,412,106 B1 | * | 6/2002 | Leask et al. ................ 717/124 |
| 6,490,721 B1 | * | 12/2002 | Gorshkov et al. .......... 717/130 |

OTHER PUBLICATIONS

Hamilton. Java and the Shift to Net–Centric Computing. IEEE. 1996. pp. 31–39.*
Bechini et al. Design of a Toolset for Dynamic Analysis of Concurrent Java Programs. IEEE. 1998. pp. 190–197.*
"JavaServer Pages Specification", by Euardo Pelegri–Llopart, et al., Sun Microsystems, Veriod 1.0, Aug. 13, 1999, pp. 1–111.
"JavaServer Pages Specification—Draft", Sun Microsystems.

* cited by examiner

Primary Examiner—Wei Zhen
(74) Attorney, Agent, or Firm—Scully, Scott, Murphy & Presser; Manny W. Schecter, Esq.

(57) ABSTRACT

This invention provides a method and system for debugging hybrid source code such as JavaServer Pages (JSP) code. The method comprises the steps of running a server within a virtual machine instance; reading a hybrid source code file into a page compiler and compiling the hybrid source code to produce a servlet source code; intercepting and loading the servlet source code into a debugger, before execution by the Web server. Using an HTML browser as client to the Web server which in turn is running in the development environment to thereby debug the JSP code in real-time. In a preferred embodiment, the load class in the page compiler is replaced to redirect the compiled source to the debugger.

27 Claims, 3 Drawing Sheets

METHOD AND SYSTEM FOR DEBUGGING HYBRID SOURCE CODE

BACKGROUND OF THE INVENTION

1. Technical Field

The present invention relates to a method and system for debugging hybrid source code, and more particularly to debugging code containing Java and HTML source code.

2. Prior Art

The ubiquitous Internet, is essentially a network of computers connected using the TCP/IP as the transportation mechanism for communicating between the computers. The World Wide Web (WWW) allows users on one computer to access files and data on remote computers using a program called a Web browser. One feature of a browser is that it allows a user to read, in a graphical user interface (GUI), Hyper Text Markup Language (HTML) documents or, colloquially, Web pages. Essentially, when the person accessing the Internet (the user) opens a browser or another similar program to view Web pages a URL (uniform resource locator) must be specified by the user, by the browser of another software program. The URL specifies the address of the computer (server) from which the Web is being requested. The server then, directly or indirectly, delivers the requested Web pages in the form of an HTML file to the browser over the Internet, generally using the Hypertext Transfer Protocol (HTTP). The browser then translates the file for viewing by the user.

As the use of the Internet progressed it became clear that simply providing people with static pages that contained only text and images was not going to be enough. For example, businesses that were going "on-line" needed more powerful tools that could allow the user to access their databases and to purchase goods over the Internet.

Unfortunately, not everyone uses the same computers or even the same operating systems, so a need arose for a programming language that could operate on any machine regardless of its operating system. One of the languages that have accomplished this is Sun Microsystems, Inc., Java™ language, an object-oriented, network capable programming language. Java is run on a virtual machine within the operating system. The communication between the virtual machine and the Java program is te same for all operating systems, and the virtual machine communicates to the operating system it is running on. Java programs can run as stand alone applications or as applets running under a Java capable browser. To create an applet, the developer writes it in the Java language, compiles it and calls it from a HTML Web page. To create an application, you write it in the Java language, compile it and call it from the command line or from another program.

Currently, the most visible examples of Java software are "applets" that are available on the Internet. These applets are sent from the server to the browser, which acts as the virtual machine to execute the applet. However, there are other kinds of Java software, including software that runs on servers, or on large mainframe computers. In these cases, Java may be used to monitor transactions, manipulate data, or to streamline the flow of information between departments, suppliers, and customers.

Further developments in this area have led to JavaServer™ (JSP) technology, which is a new hybrid language. JSP technology allows Java code to be imbedded directly into a static HTML Web document. This feature makes it possible to create dynamically generated content for Web pages quickly and easily on the server. Also, the imbedded Java code is designed to act more as a scripting language than Java programming, although it may act as both, emphasizing the use of components conforming to Sun Microsystems, Inc., JavaBeans™ specification.

JavaBeans is a portable, platform-independent component model written in the Java programming language. JavaBeans acts as a bridge between proprietary component models. Since these components do much of the processing work, component development the component (business rules) aspect of the Web page do not have to be as concerned with the appearance of the page, and vice versa.

Another advantage of the JSP technology is that it is compiled and executed on the server side. An important result of this is the fact that the browser doesn't need to have any special capabilities to view a JSP file or page since it is completely processed on the server side and delivered to the browser in HTML format. Another result is that the JSP file is only compiled once. The server checks to see if the JSP file has been altered since it was last compiled. If it has then it is recompiled, but if it hasn't then it can be run from memory reducing the average access time of the page.

From a developer's point of view, there are however still some deficiencies with the JSP development environment. Currently, the only method a developer has of verifying the JSP code that it has been written is to load the page onto a Web server, load it through a Web browser and inspect the output. While this is inefficient, it has been improved upon the introduction of a software development tool in International Business Machines Corporation's VisualAge® for Java software. This tool allows a Web server to run on the developer's computer so that it is no longer necessary to load a JSP file onto a separate server.

Further, there is still a need for an efficient method for programmers to "debug" this type of code. Essentially, debugging is the process by which a program developer searches for logic errors in the developed software that may cause the program to behave erroneously or to cease working altogether. Currently, the method of error checking is simply to insert statements into the code that strategically display important values or phrases on the screen. The programmer then utilizes this output to determine whether the program is operating as it should. Unfortunately, this method is neither very reliable nor very useful since it relies on the fact that the statements have been put in the correct places all the time. It is also a very tedious process and can lead to unwanted errors if the statements are not removed once the debugging is complete. Hence, there is a need for a debug system that mitigates some of the above disadvantages.

SUMMARY OF THE INVENTION

In accordance with an aspect of the invention, a method for debugging hybrid source code, said method comprising the steps of translating the hybrid source code into source code; loading the source code into a development environment and compiling the source code into executable code; and running the executable code in the development environment, providing an output from the executing code to a user interface, and allowing concurrent debugging of the source code and executable code in the development environment. The method may further comprise the step of running a server to provide the output to the browser. The method may also comprise the step of running the server within a virtual machine instance. The method also may comprise the step of running the server inside the development environment. The user interface may be a browser. Allowing debugging may comprise making a change to the executable code while the executable code is running without having to restart the executable code. Allowing debugging may also comprise debugging simultaneously in the development environment the source code and related code to the hybrid source. The hybrid source may be JavaServerPages code containing Java and HTML code.

In another aspect of the invention there is provided a method for debugging hybrid source code, said method comprising the steps of translating the hybrid source code into source code by a page compiler; overriding a load class method in the page compiler for redirecting the source code to a development environment and compiling the source code into executable code; and running the executable code in the development environment, providing an output from the executing code to a user interface, and allowing concurrent debugging of the source code and executable code in the development environment. The method may further comprise of running a server to provide the output to the browser. The method may further comprise running the server within a virtual machine instance. The method may also comprise running the server inside the development environment.

There is also provided a program storage device readable by a data processing system, tangibly embodying a program of instructions, executable by said data processing system to perform the above method steps.

In accordance with another aspect of the invention there is provided a computer program product for debugging hybrid source code, said computer program product comprising: means for translating the hybrid source code; means for loading the source code into a development environment and compiling the source code into executable code; and means for running the executable code in the development environment, providing an output from the executing code to a user interface, and allowing concurrent debugging of the source code and executable code in the development environment.

There is also provided a computer system for debugging hybrid source code comprising a page compiler for translating the hybrid source into source code, providing the source code to a development environment; and a development environment for compiling the source code into executable code, providing an output from the executing code to a user interface, and allowing concurrent debugging of the source code and executable code in the development environment. The method may further comprise a server to provide the output to the browser. The server may run within a virtual machine instance. The server may also run in the development environment. The user interface may be a browser. The development environment may also allow for making a change to the executable code while the executable code is running without having to restart the executable code. The development environment may also allow for debugging simultaneously in the development environment the source code and related code to the hybrid source code. The hybrid source code may be JavaServerPages code containing Java and HTML code.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
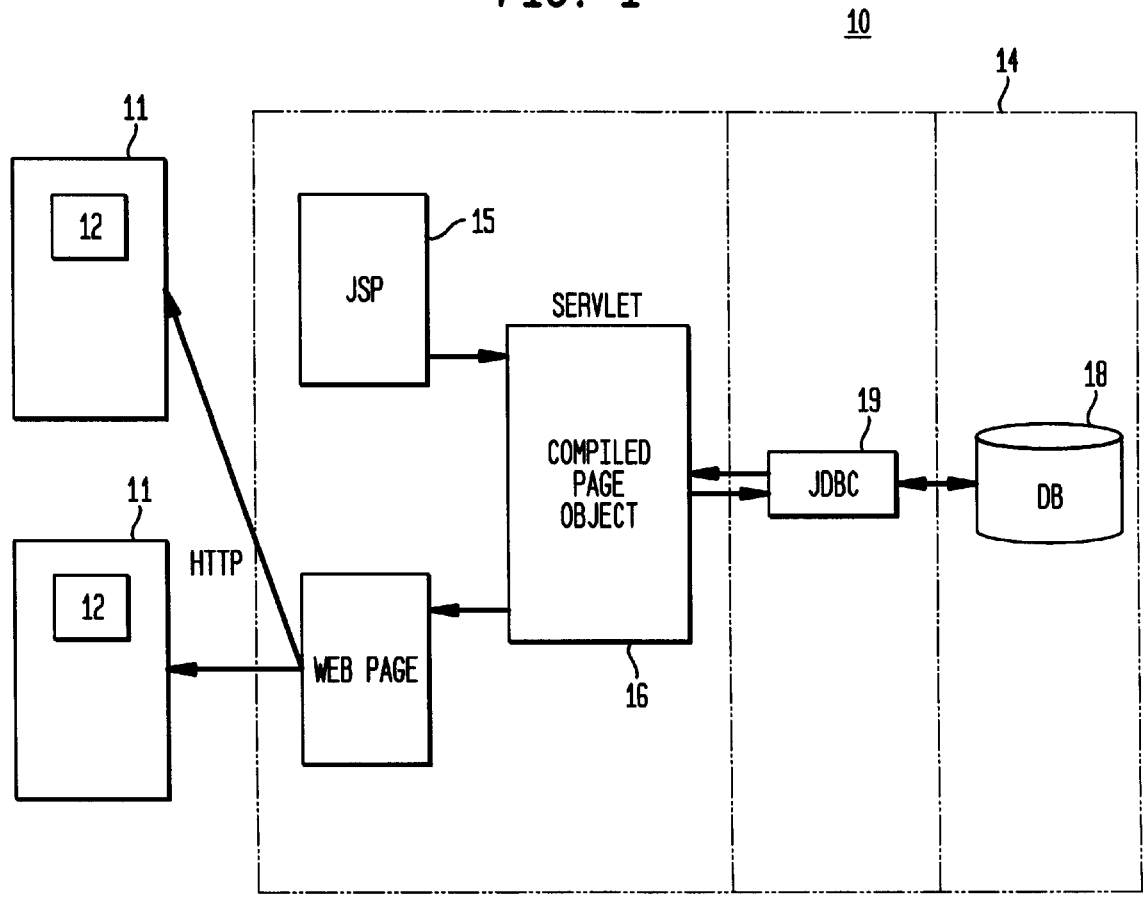
FIG. 1 is a block diagram of a Web based application.

Referring to FIG. 1, a schematic diagram of a simple two tier model of a Web-based application utilizing the JavaServer Pages technology is shown schematically by numeral 10. This model includes a first tier comprising clients 11 and a second tier comprising a server 14. These first tier clients comprise a number of Java enabled browsers 12 on various devices such as personal computers, workstations and network computers. The server side of such a system comprises servlets running inside a JavaWeb server. In this example, the client makes a request that is handled by the server (not shown). The server can generate dynamic content by loading a JSP file 15, which contains both business rules and logic of an application as well as standard document formatting such as HTML, the syntax of which is divided into component centric tags and scripting centric tags. The JSP file is translated and compiled, if necessary, to encapsulate all the referenced components into a Java servlets 16, which, in turn, sends (using HTTP) all the information to the browser in standard HTML format 17. Such translation and compilation is typically performed by a JSP code parser to translate the JSP code to Java source code and then compiled by a Java source to byte-code code compiler such as Java which is provided as part of Sun Microsystems, Inc.'s Java Development Kit (JDK). A reference implementation any Sun Microsystems, Inc. of the Java ServerPages technology provides such functionality. Alternatively, the browser may access a servlet (not shown) which, in turn, calls the JSP file, which then compiles and executes as above. Optionally, the servlet may access data on a database (DB) 18 through Sun Microsystems, Inc.'s Java database connectivity (JDBC) technology 19, which technology provides communication and query functionality for databases in the Java language.

Figure 2:
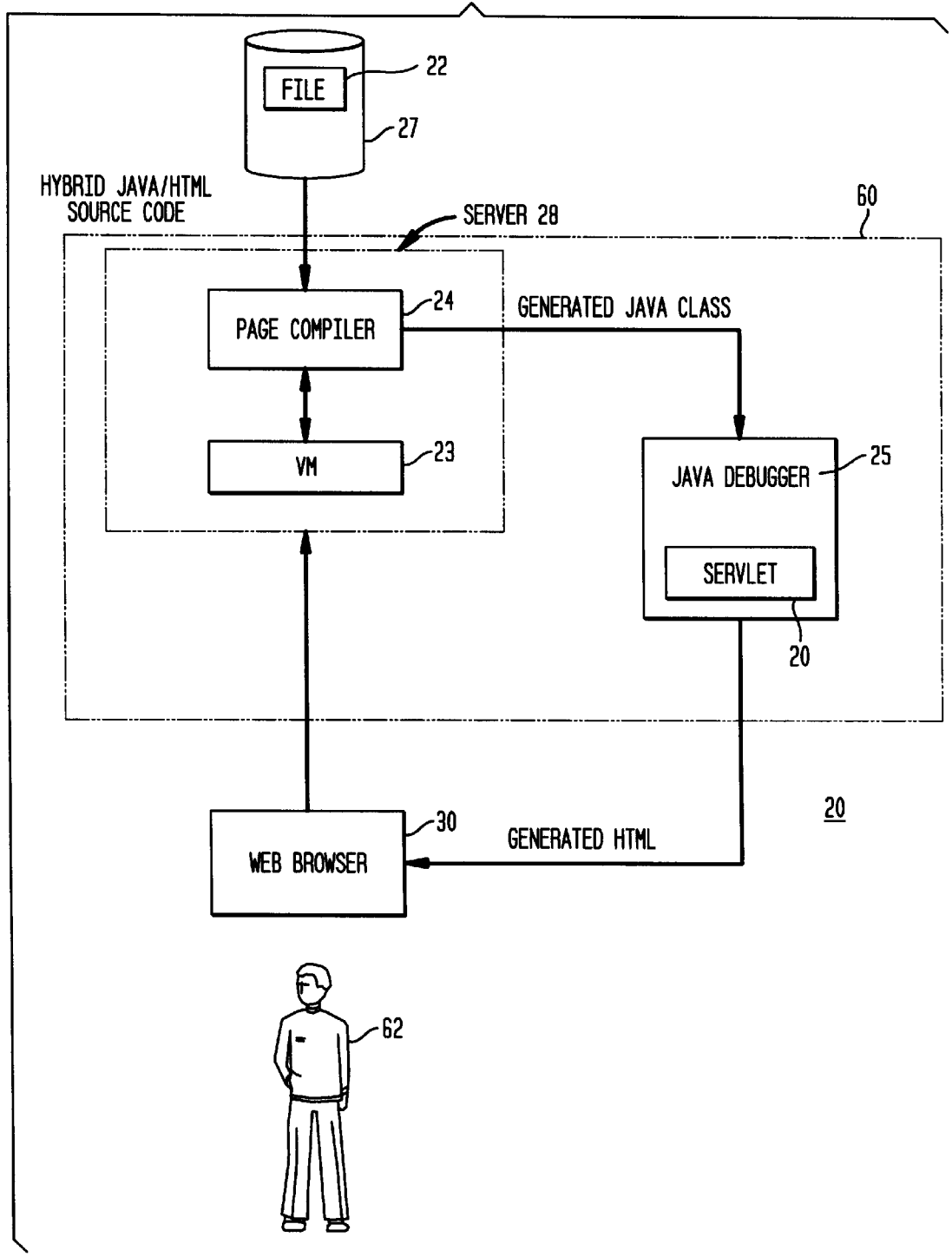
FIG. 2 is a schematic diagram of a system for debugging of a JSP file according to an embodiment of the present invention.

Referring now to FIG. 2, a schematic diagram of a system debugging a JSP file in order to detect errors in the code is shown generally by numeral 20. The system generally comprises a hybrid source code file 22 which in a preferred embodiment is JSP source code containing HTML and Java source code, which is stored on a file system 27 and compiling the servlet source code into a servlet; a Web application server 28 (comprising a virtual machine 23) for invoking a page compiler 24 to form the servlet 26 in response to an HTTP request from a Web browser 30 with respect to the JSP code 22 for executing the servlet in response to an HTTP request and for providing HTML output from the servlet to the browser; a page compiler 24 which is called by the server 28 for reading the JSP source code, translating the JSP code into servlet source code; a debugger 25 for receiving the Java source from the page compiler; and a Web browser 30 for sending an HTTP request with respect to the JSP code (and corresponding servlet) to the server and for displaying received HTML code form the servlet. In a preferred embodiment, the system, including the server, is integrated into a development environment 60 such as International Business Machines Corporation's VisualAge7 for Java application development software. Each of the above components will now be discussed in detail.

Figure 3:
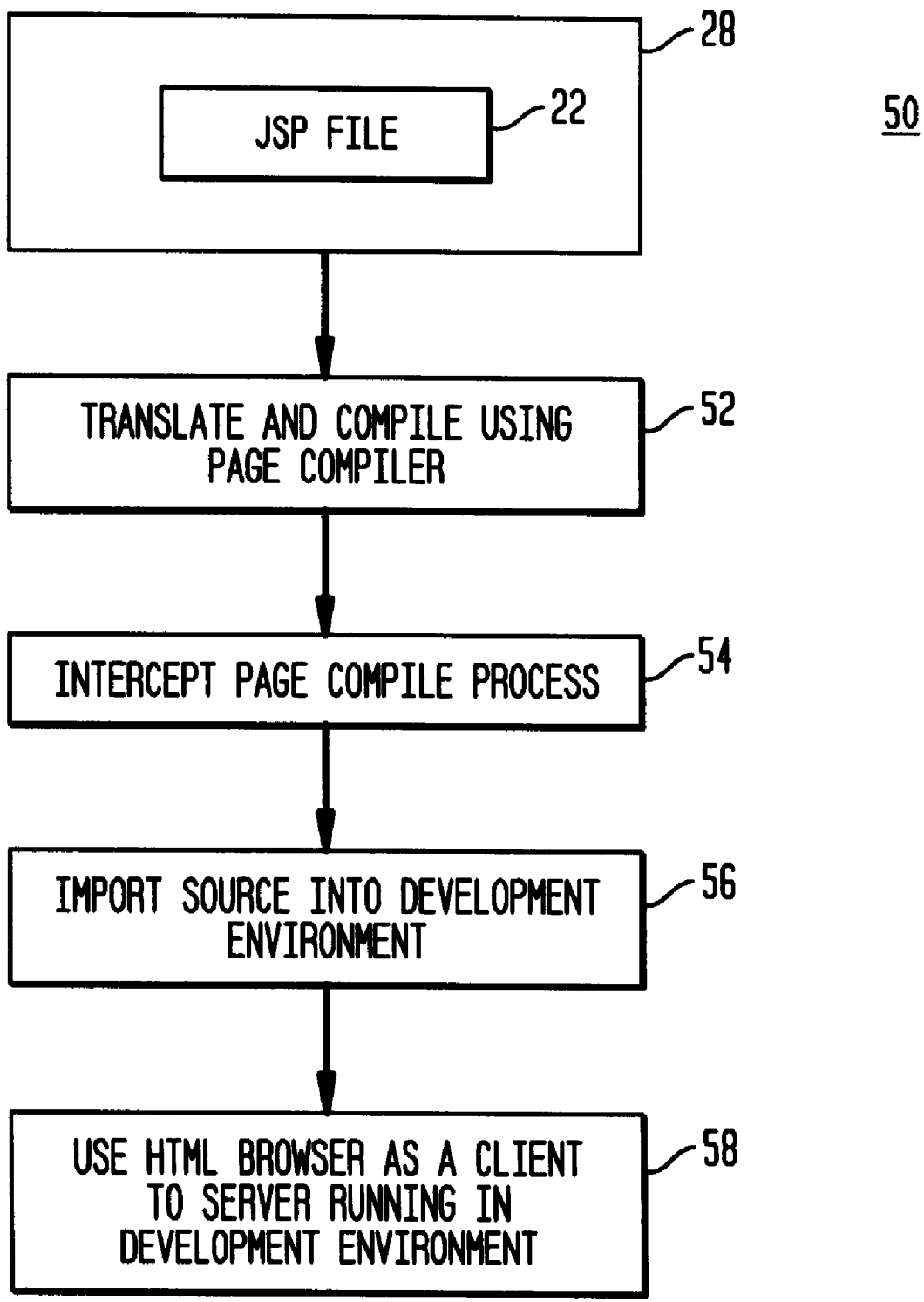
FIG. 3 is a flowchart showing the operation of the system of FIG. 2.

Referring now to FIG. 3 (in combination with FIG. 2), a flow diagram illustrating the operation of the system is indicated generally by numeral 50. The browser 30 makes an HTTP request 52 for the JSP code to the Web server 28. In step 54 of FIG. 3, the server invokes the page compiler 24 (of FIG. 2) and the page compiler invokes its load class method and reads the JSP source code from the file system 27 (of FIG. 2). An example of a JSP source file is shown in the following table. The Java code is delimited by <% and %>.

TABLE I

| Line # | Source Text |
| --- | --- |
| 1 | <% for (int i = 0; i <=100; i+=10) {%> |
| 2 | <tr ALIGN=RIGHT BGCOLOR="#CCCCCC"> |
| 3 | <td><%=i%></td> |
| 4 | <td><%+ (i − 32) *5/9%></td> |
| 5 | </tr> |
| 6 | <%{%> |

The page compiler translates 56 the JSP code (e.g. the code of Table I) into servlet source code (in the form of Java instructions) and stores it to the file system (step 3 of FIG. 2). In a preferred embodiment, the page compiler, before reading and translating the JSP code, performs checks to see if the JSP code (whether already in memory or on the file system) is unchanged since a last request by the browser. If it is unchanged, translation need not be performed again. A section of the generated code for the JSP code example above is shown in the following Table II.

TABLE II

| Line # | Servlet source |
| --- | --- |
| 45 | for (int i=0; i<=100; i+=10) { |
| 46 | //com.sun.sserver.http.pagecompile.jsp.CharArrayChunk d:/www/html/temperature.jsp 18,43-d:/www/html/temperature.jsp 20,5data{0}.writeChars(381,42,out); |
| 47 | //com.sun.server.http.pahecompile.jsp.ScriptletChunk d:/www/html/temperature.jsp 20,5-d:/www/html/temperature.jsp 20,13 out.print(ServletUtil.toString(i)); |
| 48 | //com.sun.server.http.pagecompile.jsp.CharArrayChunk d:/www/html/temperature.jsp 20,13-d:/www/html/temperature.jsp 21,5 data {0}.writeChars(431,11,out); |
| 49 | //com.sun.server.http.pagecompile.jsp.ScriptletChunk d:/www/html/temperature.jsp 21,5-d:/www/hmtl/temperature.jsp 21,28 out.print(ServletUtil.toString(i-32)*5/9)); |
| 50 | //com.sun.server.http.pagecompile.jsp.CharArrayChunk d:/www/html/temperature.jsp 21,28-d:/www/html/temperature.jsp23,1 data{0}.writeChars(465,14,out); |
| 51 | //com.sun.server.http.pagecompile.jsp.ScriptletChunk d:/www/html/temperature.jsp 23,1-d:/www/html/temperature.jsp 23,8 } |

Once the translation portion of the page compile process has completed, the page compiler compiles 56 the servlet source code to a servlet (in byte code form) that is executed within the Web server. Normally, the page compiler completes its load class method by, after translating and compiling, loading the servlet, and then serving it to the Web server for execution (and providing the HTML output of the servlet to the browser). However, in the present invention, the servlet, the result of the page compile process, is intercepted 58 by specifically overriding the load class method of the page compiler. A new load class method imports the servlet source code to a Java compiler in a development environment 60, such as VisualAge for Java, which allows the user to debug the servlet source code as any other Java program. Particularly, the development environment integrates both debugging of the servlet source code and a Java virtual machine for execution of the servlet (compiled in the development environment from the servlet source code). In the preferred embodiment, the development environment provides for modification of a running servlet on the development environment Java virtual machine thereby allowing a user to debug the servlet without having to restart its execution. Debugging techniques of code such as Java code are well documented and will not be discussed further.

Further, the servlet interfaces with a server 28 contained in the development environment. As the servlet runs on the server within the development environment, the servlet HTML output is sent by the server to the browser for viewing by the user 62. Thus, it is possible to use an HTML browser as a client to a Web server which runs in a development environment in combination with a Java compiler to effectively debug in real-time the execution of Java code specified in a JSP file. In the preferred embodiment, the JSP source remains conveniently outside the development environment on the file system.

The subject invention thus allows the developer to effectively debug servlets and JSP files. Furthermore, by setting break points, stepping, inspecting the servlet source code, and other debugging techniques, the JSP code can be edited, tested into a running Web server and eventually deployed to a production Web server. The code is thus deployed with significantly better assurance that it performs as expected. Moreover, in the preferred embodiment, other related code to the JSP file, such as Java beans and even other JSP files can be simultaneously debugged to provide overall end-to-end debugging capability of a Java application incorporating the JSP code.

The invention may be implemented as a program storage device readable by a data processing system, tangibly embodying a program of instructions, executable by said data processing system to perform the method steps of the invention. Such a program storage device may include diskettes, optical discs, tapes, CD-ROMS, hard drives, memory including ROM or RAM, computer tapes or other storage media capable of storing a computer program.

The invention may also be implemented in a computer system. In a preferred embodiment, a system is provided comprising a computer program operating on a data processing system, with the computer program embodying te method of the invention and producing an output of the method on a display and/or an input deice. Data processing systems include computers, computer networks, embedded systems and other systems capable of executing a computer program. A computer includes a processor and a memory device and optionally, a storage device, a video display and/or an input device. Computers may equally be in stand-alone form (such as the traditional desktop personal computer) or integrated into another apparatus (such as a cellular telephone).

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for debugging hybrid source code, said method comprising the steps of:

translating the hybrid source code, in which a single source file comprises a source code in a second language imbedded in a source code of a markup language, into source code;

loading the source code into a development environment and compiling the source code into executable code; and running the executable code in the development environment, providing an output from the executable code to a user interface, and allowing concurrent debugging of the source code and executable code in the development environment.

2. The method of claim 1 further comprising the step of running a server to provide the output to the user interface.

3. The method of claim 2 further comprising the step of running the server within a virtual machine instance.

4. The method of claim 2 further comprising the step of running the server inside the development environment.

5. The method of claim 1 wherein the user interface is a browser.

6. The method of claim 1 wherein allowing debugging comprises make a change to the executable code while the executable code is running without having to restart the executable code.

7. The method of claim 1 wherein allowing debugging comprises debugging simultaneously in the development environment the source code and related code to the hybrid source code.

8. The method of claim 1 wherein the hybrid source is JavaServer Pages code containing Java and HTML code.

9. A program storage device readable by a data processing system, tangibly embodying a program of instructions, executable by said data processing system to perform the method steps of claim 1.

10. The method of claim 1, wherein the single source file provides for a first programming language to be imbedded directly into a different second programming language.

11. A method for debugging hybrid source code, said method comprising the steps of:

translating the hybrid source code, in which a single source file comprises a source code in a second language imbedded in a source code of a markup language, into source code by a page compiler;

overriding a load class method in the page compiler for redirecting the source code to a development environment and compiling the source code into executable code; and running the executable code in the development environment, providing an output from the executable code to a user interface, and allowing concurrent debugging of the source code and executable code in the development environment.

12. The method of claim 11 further comprising the step of running a server to provide the output to the user interface.

13. The method of claim 12 further comprising the step of running the server within a virtual machine instance.

14. The method of claim 12 further comprising the step of running the server inside the development environment.

15. A program storage device readable by a data processing system, tangibly embodying a program of instructions, executable by said data processing system to perform the method steps of claim 11.

16. The method of claim 11, wherein the single source file provides for a first programming language to be imbedded directly into a different second programming language.

17. A computer program product for debugging hybrid source code, said computer program product comprising:

means for translating the hybrid source code, in which a single source file comprises a source code in a second language imbedded in a source code of a markup language, into source code;

means for loading the source code into a development environment and compiling the source code into executable code; and means for running the executable code in the development environment, providing an output from the executable code to a user interface, and allowing concurrent debugging of the source code and executable code in the development environment.

18. The computer program product of claim 17, wherein the single source file provides for a first programming language to be imbedded directly into a different second programming language.

19. A computer system for debugging hybrid source code comprising:

a page compiler for translating the hybrid source code, in which a single source file comprises a source code in a second language imbedded in a source code of a markup language, into source code, providing the source code to a development environment; and a development environment for compiling the source code into executable code, providing an output from the executable code to a user interface, and allowing concurrent debugging of the source code and executable code in the development environment.

20. The computer system of claim 19 further comprising a server to provide the output to the user interface.

21. The computer system of claim 20 wherein the server runs within a virtual machine instance.

22. The computer system of claim 20 wherein the server runs in the development environment.

23. The computer system of claim 19 wherein the user interface is a browser.

24. The computer system of claim 19 wherein the development environment allows for making a change to the executable code while the executable code is running without having to restart the executable code.

25. The computer system of claim 19 wherein the development environment allows for debugging simultaneously in the development environment the source code and related code to the hybrid source code.

26. The computer system of claim 19 wherein the hybrid source code is JavaServer code containing Java and HTML code.

27. The computer system of claim 19, wherein the single source file provides for a first programming language to be imbedded directly into a different second programming language.

* * * * *